(No Model.)
J. B. DENTON.
FERTILIZER DISTRIBUTER.
No. 314,920. Patented Mar. 31, 1885.
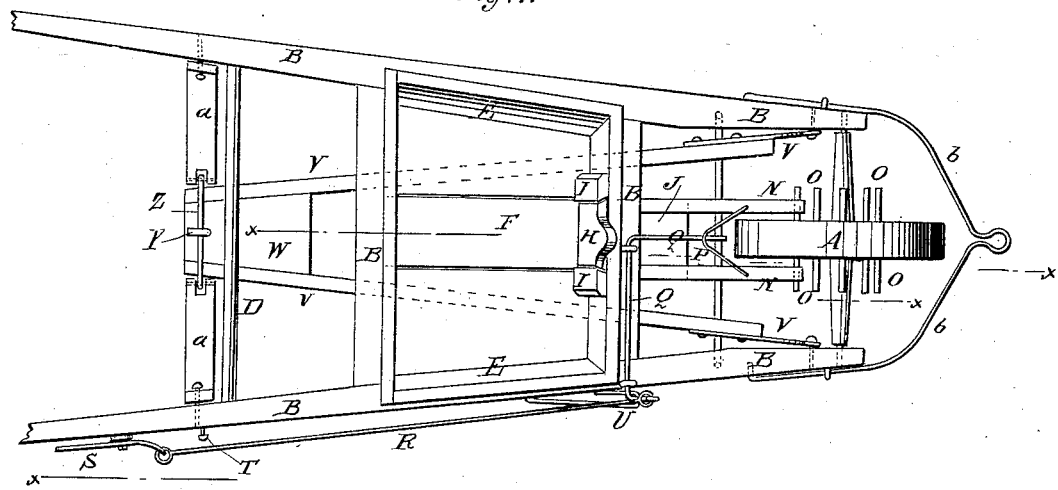
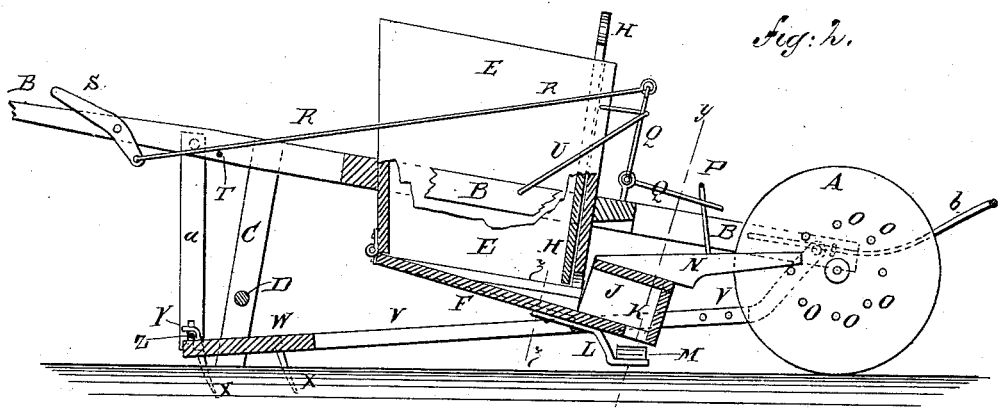
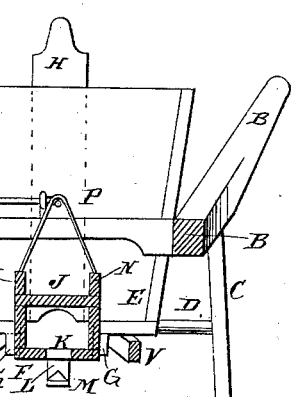
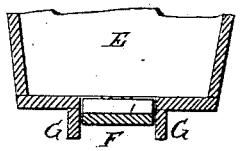
WITNESSES:
Chas. Nidu.
C. Sedgwick
INVENTOR:
J. B. Denton
BY Munn & Co
ATTORNEYS.

UNITED STATES PATENT OFFICE.

JOSEPH B. DENTON, OF NEWTOWN, NEW YORK.

FERTILIZER-DISTRIBUTER.

SPECIFICATION forming part of Letters Patent No. 314,920, dated March 31, 1885.

Application filed June 17, 1884. (No model.)

*To all whom it may concern:*

Be it known that I, JOSEPH B. DENTON, of Newtown, in the county of Queens and State of New York, have invented certain new and useful Improvements in Fertilizer-Distributers, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a side elevation of the same, partly in section, through the broken line $x\,x\,x\,x$, Fig. 1. Fig. 3 is a sectional rear elevation of the same, taken through the line $y\,y$, Fig. 2. Fig. 4 is a sectional rear elevation of a part of the same, taken through the line $z\,z$, Fig. 2. Fig. 5 is a sectional front elevation of the same, taken through the line $z\,z$, Fig. 2.

The object of this invention is to promote convenience and secure uniformity in the distribution of fertilizers.

The invention consists in the peculiar construction and arrangement of parts, as hereinafter fully described, and pointed out in the claims.

A represents the drive-wheel, which is journaled to and between the forward ends of the side bars of the frame B. The rear ends of the side bars of the frame B are rounded to serve as handles, and the said side bars are provided with legs C, connected by a round, D.

As thus far described the construction is the same as that of a wheelbarrow.

E is the hopper or feed-box, the middle board, F, of the bottom of which is loose and is hinged at its rear end to the lower edge of the back of the said hopper, so that the forward end of the said board can have a vertical movement. The forward part of the board F is kept from lateral movement by downwardly-projecting flanges G, attached to the bottom of the hopper E, adjacent to the side edges of the vibrating board F. The lower edge of the front of the hopper E, over the board F, is recessed, as shown in Figs. 2, 3, and 5, so that the fertilizer can pass out freely. The amount of fertilizer distributed is regulated by a gate, H, sliding in rabbeted cleats I, attached to the inner surface of the front of the hopper E. The forward end of the board F projects, and to it is attached a box, J, to prevent the fertilizer from falling off the side edges of the said board, and which is open at the rear or inner side to admit the fertilizer freely.

In the forward end of the board F is formed an opening, K, through which the fertilizer falls to the ground.

To the lower side of the forward part of the board F is attached an arm, L, which projects downward and then forward, and to it, directly below the discharge-opening K, is attached a triangular block, M, upon which the fertilizer falls from the said opening, and is spread or scattered to prevent it from falling in a heap.

To the top of the box J are attached two arms, N, which project forward upon the opposite sides of the drive-wheel A.

To the wheel A, at a little distance from its hub, is attached a circle of pins, O, the ends of which project upon the opposite sides of the said wheel A, and upon them rest the ends of the arms N, so that the board F will be jarred as the arms N drop from one pin O to the next pin to cause the fertilizer to pass out regularly.

To the middle parts of the arms N are attached the ends of a bail, P, with which engages the forwardly-projecting arm of the bent lever Q, the middle part of which rocks in bearings attached to a cross-bar of the frame B.

To the end of the upwardly-projecting arm of the bent lever Q is pivoted the forward end of the connecting-rod R, the rear end of which is pivoted to the end of the short arm of the lever S. The lever S is pivoted to the side of the rear part of the side bar or handle of the frame B. With this construction by throwing the long arm of the lever S forward, which can be done by sliding the hand that holds the side bar of the frame forward, the bent lever Q will be operated to raise the arms N out of contact with the pins O and to raise the board F into its place in the bottom of the hopper E and stop the distribution of the fertilizer. The long arm of the lever S, when swung forward, rests upon a stop-pin, T, attached to the side bar of the frame B in such a position as to be a little below the line of the connecting-rod R, so that the arms N and board F will be locked in a raised position. The long arm of the lever S can be swung back to drop the bar N and board F into a working position by pressing the short arm of the said lever S downward with the thumb of the hand that holds the side bar of the frame B without removing the hand from the said side bar. The forward movement of the upwardly-projecting arm of the bent lever Q, and consequently the drop of the arms N, is limited by the keeper U, attached to the hopper E and to the frame B.

To the inner sides of the forward parts of the side bars of the frame B are pivoted the upwardly-inclined ends of two bars, V, which extend back beneath the hopper E, and are attached at their rear ends to the opposite side edges of the harrow frame, block, or plate W, to which the harrow-teeth X are attached to mix the fertilizer and soil.

To the upper side of the rear end of the toothed block W is attached a hook, Y, to hook upon a cross-rod, Z, attached to the lower ends of two bars, a, to support the harrow away from the ground when turning the machine and when passing from place to place. The upper ends of the bars a are pivoted to the side bars of the frame B, so that the bars a and rod Z can be readily swung forward and back to engage with and release the hook Y.

When the machine is at work, the cross-rod Z rests upon the upper side of the harrow-frame W, so that the weight of the rear part of the machine will rest upon the harrow to hold the said harrow to its work and to relieve the operator from having to carry the said weight.

To the forward ends of the side bars of the frame B are attached the ends of the bail b. In the center of the bail b is formed an eye to which the draft is applied.

Having thus described my invention, I claim as new and desire to secure by Letters Patent—

1. In a fertilizer-distributer, the combination, with the frame B, the wheel A, provided with the pins O, and the hopper E, of the hinged board F, having its free end projecting beyond the hopper and provided with the opening K, the box J on the free end of the said board, and the arms N on the box, substantially as herein shown and described.

2. In a fertilizer-distributer, the combination, with the frame B, the wheel A, provided with the pins O, and the hopper E, of the hinged board F, provided with the opening K, the box J on the free end of the said board, the prongs N on the box, and means for raising the said prongs out of contact with the pins O, substantially as herein shown and described.

JOSEPH B. DENTON.

Witnesses:
JAMES T. GRAHAM,
C. SEDGWICK.